United States Patent
Zayatz

(10) Patent No.: US 6,317,335 B1
(45) Date of Patent: *Nov. 13, 2001

(54) STIFFENED PROTECTION DEVICE FOR PROTECTING AN ELECTRICAL COMPONENT

(75) Inventor: Robert Zayatz, North Tonawanda, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/538,917

(22) Filed: Mar. 30, 2000

Related U.S. Application Data

(63) Continuation-in-part of application No. 09/404,934, filed on Sep. 24, 1999, now Pat. No. 6,205,034.

(51) Int. Cl.$^7$ .................................................... H01R 9/00
(52) U.S. Cl. .................. 361/824; 361/600; 361/601; 429/99; 429/100; 429/171
(58) Field of Search ........................ 361/824, 600–602, 361/811; 429/1, 7, 46, 99–100, 164, 171

(56) References Cited

U.S. PATENT DOCUMENTS

| | | | |
|---|---|---|---|
| 3,663,301 | 5/1972 | Ralston et al. | 136/107 |
| 3,841,913 | 10/1974 | Anderson | 136/107 |
| 4,047,790 | 9/1977 | Carino | 339/220 |
| 4,302,517 | 11/1981 | Dziak | 429/66 |
| 4,670,362 | 6/1987 | Wiacek et al. | 429/174 |
| 4,957,832 | 9/1990 | Ruggeberg et al. | 429/164 |
| 4,970,073 | 11/1990 | Arzur et al. | 429/152 |
| 5,194,340 | 3/1993 | Kosako | 429/1 |
| 5,264,303 | 11/1993 | McCaffery | 429/99 |
| 5,283,137 | 2/1994 | Ching | 429/175 |
| 5,376,467 | 12/1994 | Abe et al. | 429/7 |
| 5,434,017 | 7/1995 | Berkowitz et al. | 429/94 |
| 5,529,858 | 6/1996 | Wicker et al. | 429/149 |
| 5,532,081 | 7/1996 | DePalma et al. | 429/171 |
| 5,549,985 | 8/1996 | Heller et al. | 429/157 |
| 5,589,293 | 12/1996 | Pope et al. | 429/172 |
| 5,672,443 | 9/1997 | Salisbury et al. | 429/185 |
| 5,750,283 | 5/1998 | DePalma et al. | 429/56 |
| 5,759,713 | 6/1998 | DePalma et al. | 429/54 |
| 5,770,328 | 6/1998 | Friedli et al. | 429/96 |
| 5,776,631 | 7/1998 | Wu | 429/171 |
| 5,786,980 | 7/1998 | Evans | 361/502 |
| 5,821,010 | 10/1998 | Taylor | 429/172 |
| 5,843,597 | 12/1998 | Getz | 429/174 |
| 6,205,034 | * 3/2001 | Zayatz | 361/824 |

OTHER PUBLICATIONS

Patent Abstracts of Japan, Publication No. 07201358, Publication date Aug. 4, 1995.
Patent Abstracts of Japan, Publication No. 09231959, Publication date Sep. 5, 1997.
Patent Abstracts of Japan, Publication No. 11026029, Publication date Jan. 29, 1999.

* cited by examiner

*Primary Examiner*—Jeffrey Gaffin
*Assistant Examiner*—Tuan Dinh
(74) *Attorney, Agent, or Firm*—Hodgson Russ LLP

(57) ABSTRACT

A protection device and a method for protecting an electrical component. The protection device has a protective housing and a terminal cap. The protective housing has a base with a contact hole therethrough for receiving an electrical terminal pin, and has a projecting shoulder extending from the base to a first distance from the base. The protective housing also has a retaining clip extending from the base to a second distance from the base, the second distance being greater than the first distance. The terminal cap has a first side and a second side, and in use, at least part of the first side of the terminal cap contacts the projecting shoulder and at least part of the second side of the terminal cap contacts the retaining clip. A method according to the present invention includes steps for assembling a battery and an electrical component housed within the protection device described above.

28 Claims, 12 Drawing Sheets

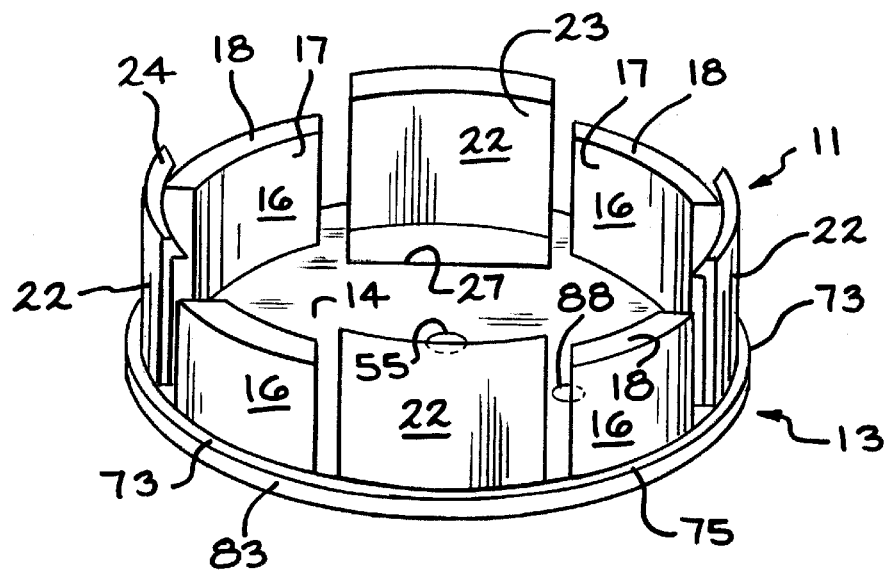
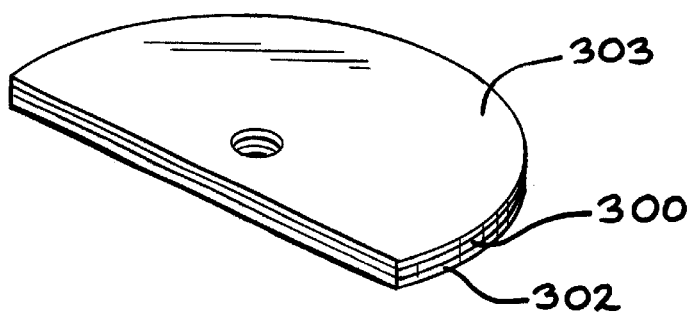
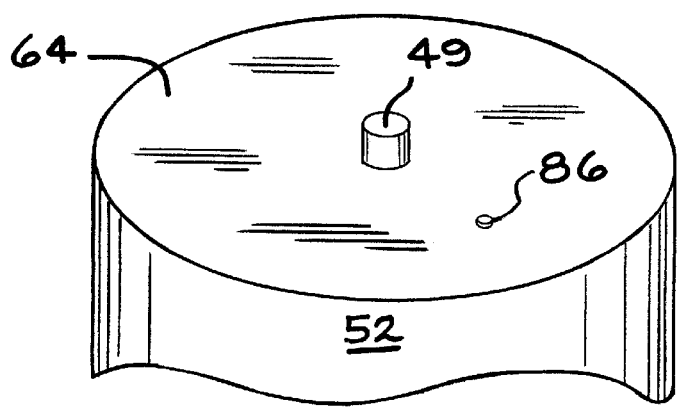
FIG. 12

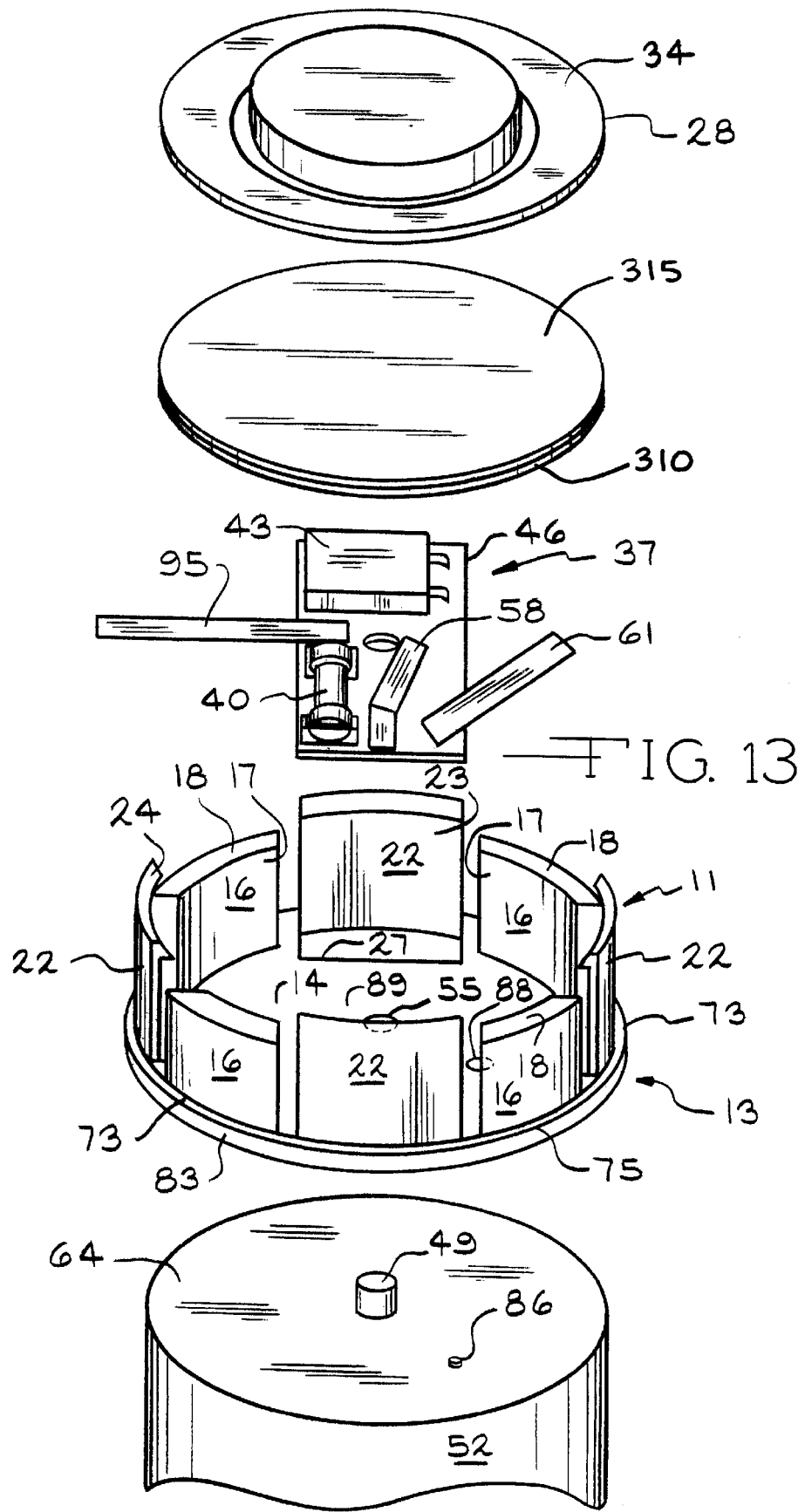

US 6,317,335 B1

STIFFENED PROTECTION DEVICE FOR PROTECTING AN ELECTRICAL COMPONENT

CROSS CLAIM TO RELATED APPLICATION

This application is a continuation-in-part of U.S. patent application Ser. No. 09/404,934 filed Sep. 24, 1999 now U.S. Pat. No. 6,205,034 (Mar. 20, 2001).This application claims the benefit of U.S. patent application Ser. No. 09/404, 934 under the provisions of 35 U.S.C. 120.

BACKGROUND OF THE INVENTION

1. Field of the Invention

The present invention relates generally to devices for protecting an electrical component. More specifically, the present invention relates to a protection device for an electrical component connected to a battery.

2. Discussion of Related Art

In the prior art, there are devices for protecting an electrical component, such as a fuse and diode assembly, connected to and mounted on a battery. Such prior art devices include a cylindrical spacer ring and a terminal cap. The spacer ring is positioned on an end of the battery. The electrical component resides within the spacer ring, and is electrically connected to the battery by at least one, and sometimes two electrical, leads. Another electrical lead of the electrical component is connected to the terminal cap.

To assemble the battery, the electrical component and the prior art spacer ring, an electrically insulating half-moon disk is placed on the battery header. Next, the electrical component is placed on the half-moon disk. Then the first electrical lead of the electrical component is welded to a terminal pin of the battery. If provided, a second electrical lead of the electrical component is welded to the header of the battery. Next, the spacer ring is placed on the battery so as to encircle the electrical component. Then the volume within the spacer ring and above the battery, which is not occupied by the electrical component, is filled with an adhesive material, which may be a polyamide material such as AD-TECH 700 manufactured by Adhesive Technologies, Inc. of Hampton, N.H. (sometimes referred to as "hot-melt"), or which may be an epoxy or silicone material. In doing so, the electrical component is substantially covered with the adhesive material. Only a portion of an electrical lead of the electrical component extends out of and is not entirely covered with the adhesive material. Next, an insulating disk is placed partially into the adhesive material, and a terminal cap is placed over the insulating disk, as well as that portion of the adhesive material which is not covered by the insulating disk. Finally, the exposed electrical lead of the electrical component extending from the adhesive material is welded to the terminal cap.

Such prior art assemblies have disadvantages. For example, they are not able to withstand temperatures of 200 C. or more. Adhesive material used in the prior art assemblies fail at temperatures around or below 170° C. In addition methods of making such prior art assemblies take a great amount of time are costly and are messy, primarily due to the adhesive material. Furthermore, a substantial amount of scrap material is generated in manufacturing such prior art assemblies. Finally, if the electrical component does not operate properly, removal and replacement with a properly operating electrical component is difficult, if not impossible.

SUMMARY OF THE INVENTION

Accordingly, it is an object of the present invention to provide a protection device which can withstand temperatures of 200 C. or more.

Another object of the present invention is to provide a protection device and method which permits but does not require the use of adhesive material when assembling the battery and an electrical component.

Yet another object of the present invention is to provide a protection device that permits replacement of an improperly operating electrical component.

The foregoing objectives are realized by the present invention, which is a protection device for an electrical component that has a protective housing and a terminal cap. The protective housing has a base with a contact hole therethrough for accommodating an electrical terminal pin. A projecting shoulder extends from the base to a first distance from the base. In addition, a retaining clip extends from the base to a second distance from the base, the second distance being greater than the first distance. The terminal cap has a first side and a second side, and in use, at least part of the first side of the terminal cap contacts the projecting shoulder and at least part of the second side of the terminal cap contacts the retaining clip to thereby capture the terminal cap between the projecting shoulder and the retaining clip.

In a method according to the present invention, a battery and an electrical component are assembled. The method begins by providing a battery having a terminal pin, and providing a protective housing having a base with a contact hole therethrough. The protective housing is mounted on the battery so that the terminal pin extends into the contact hole. Next, an electrical component is provided on the base and electrically connected to the terminal pin. Finally, a terminal cap is provided in contact with the protective housing and connected to the electrical component.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which:

FIG. 12 is an exploded perspective view of an another embodiment of the present invention; and FIG. 13 is an exploded perspective view of yet another embodiment of the present invention.

BEST MODE FOR CARRYING OUT THE INVENTION

Figure 1:
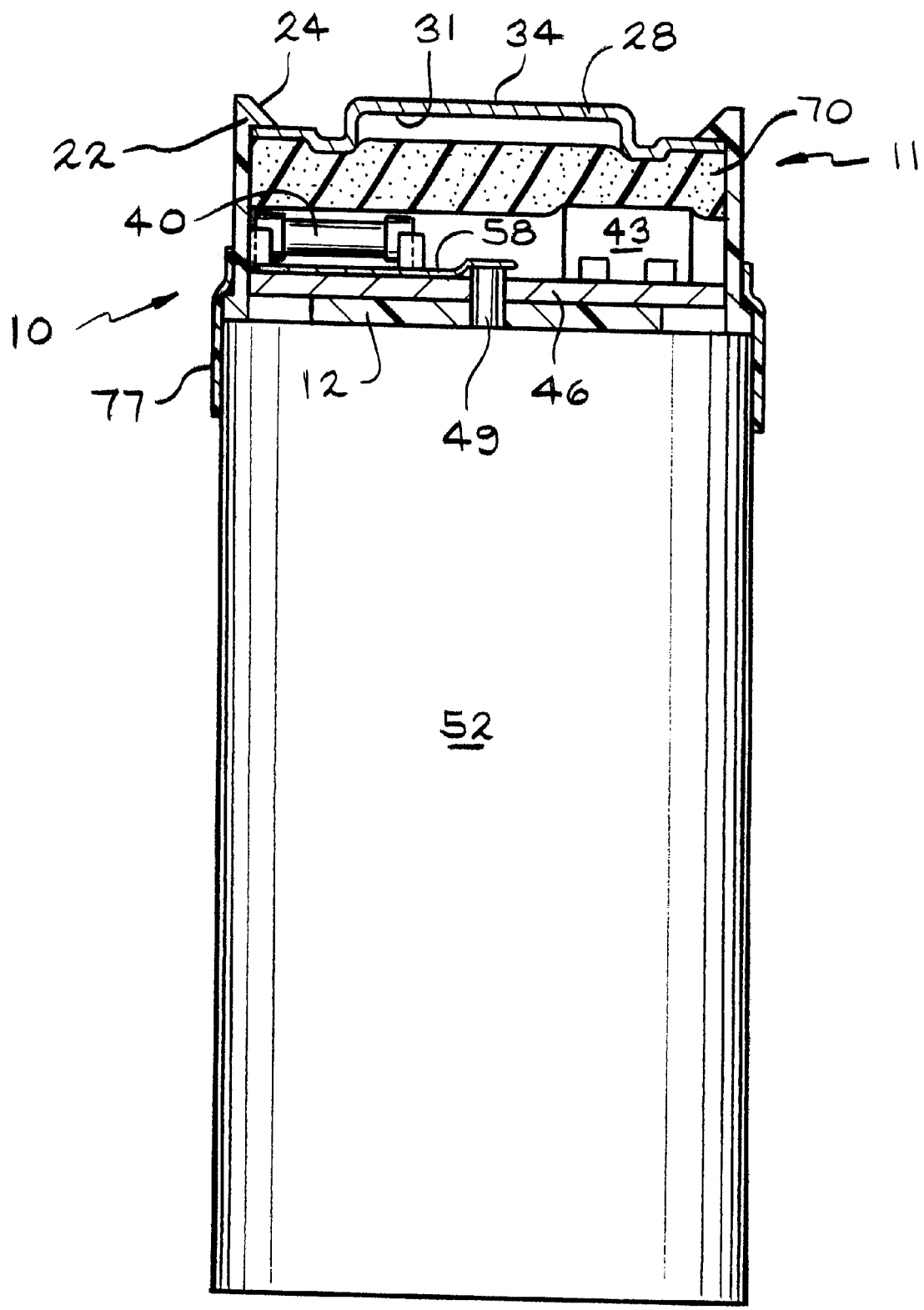
FIG. 1 is a partially cross sectioned side view of a protection device according to the present invention mounted on the header of a battery.
Figure 2:
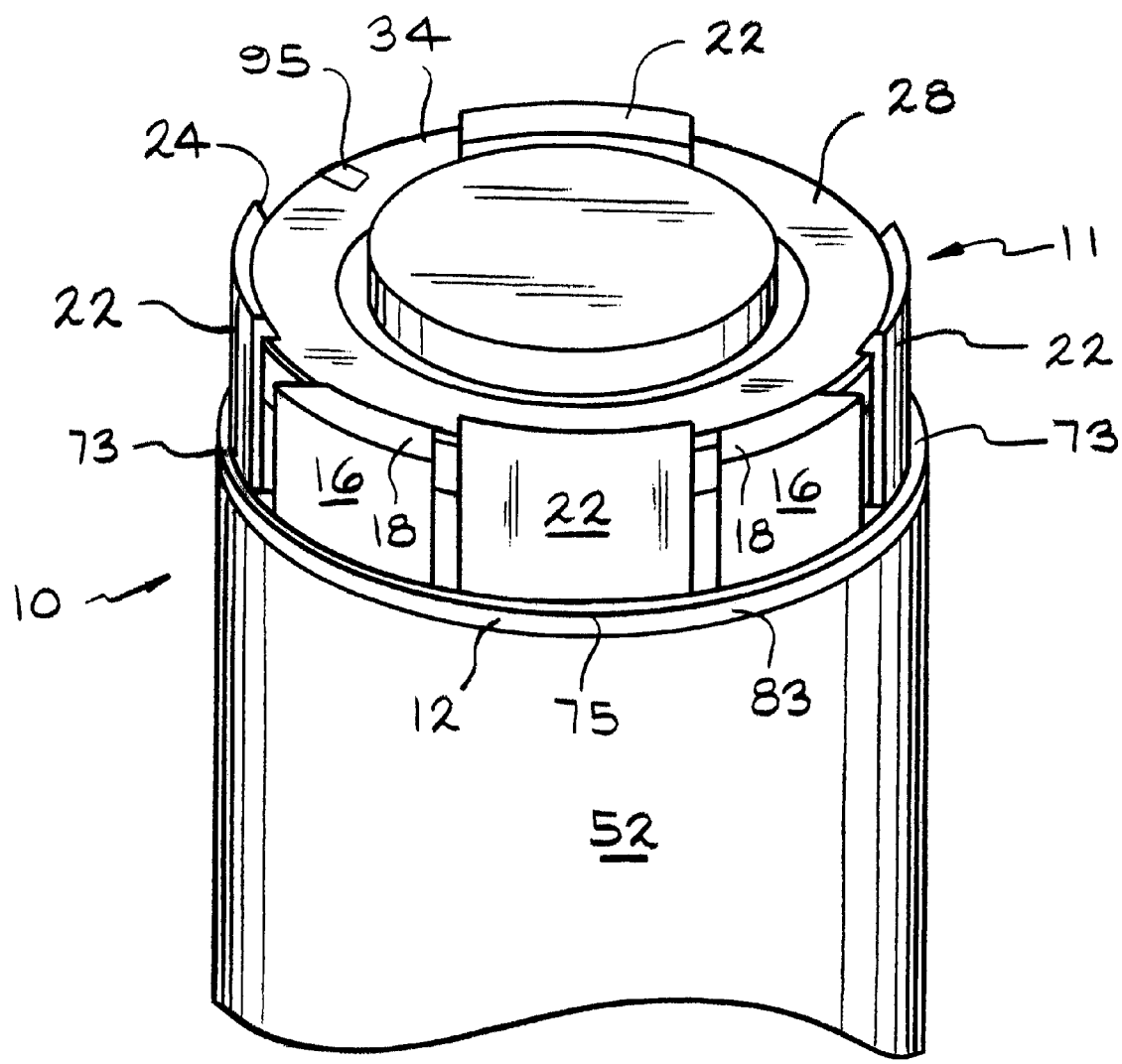
FIG. 2 is a perspective view of the protection device shown in FIG. 1.
Figure 3:
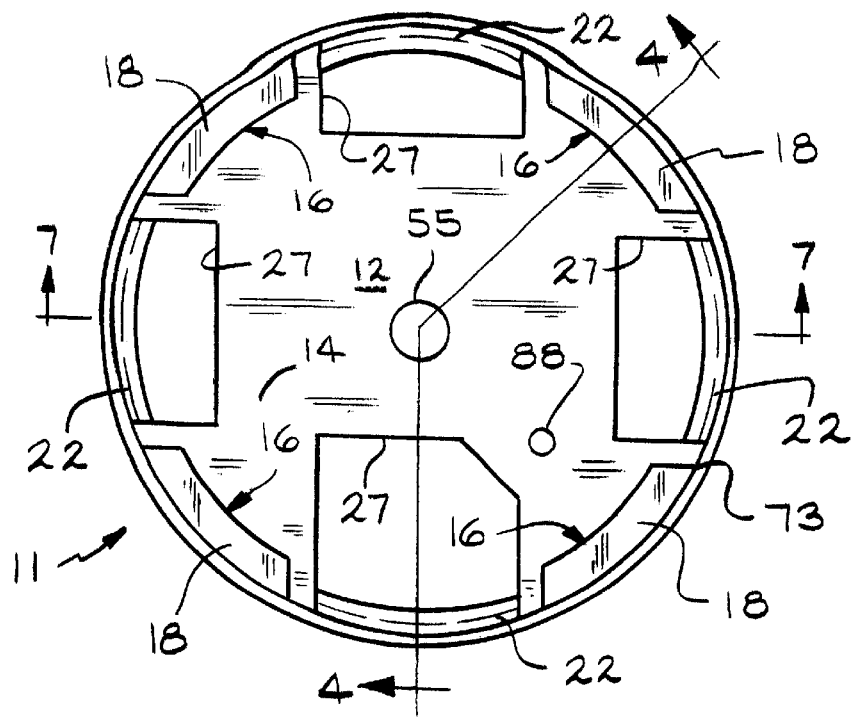
FIG. 3 is a top view of the protective housing according to the present invention.
Figure 4:
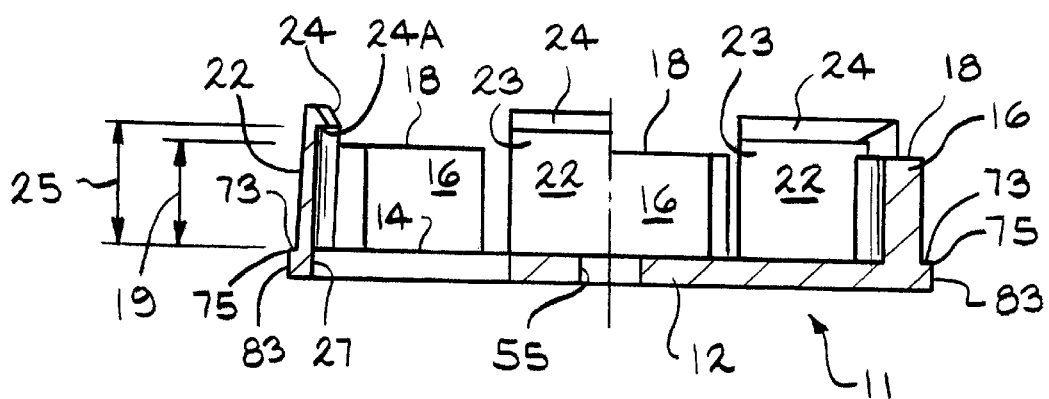
FIG. 4 is a cross sectional view of the protective housing taken along line 4—4 shown in FIG. 3.
Figure 5:
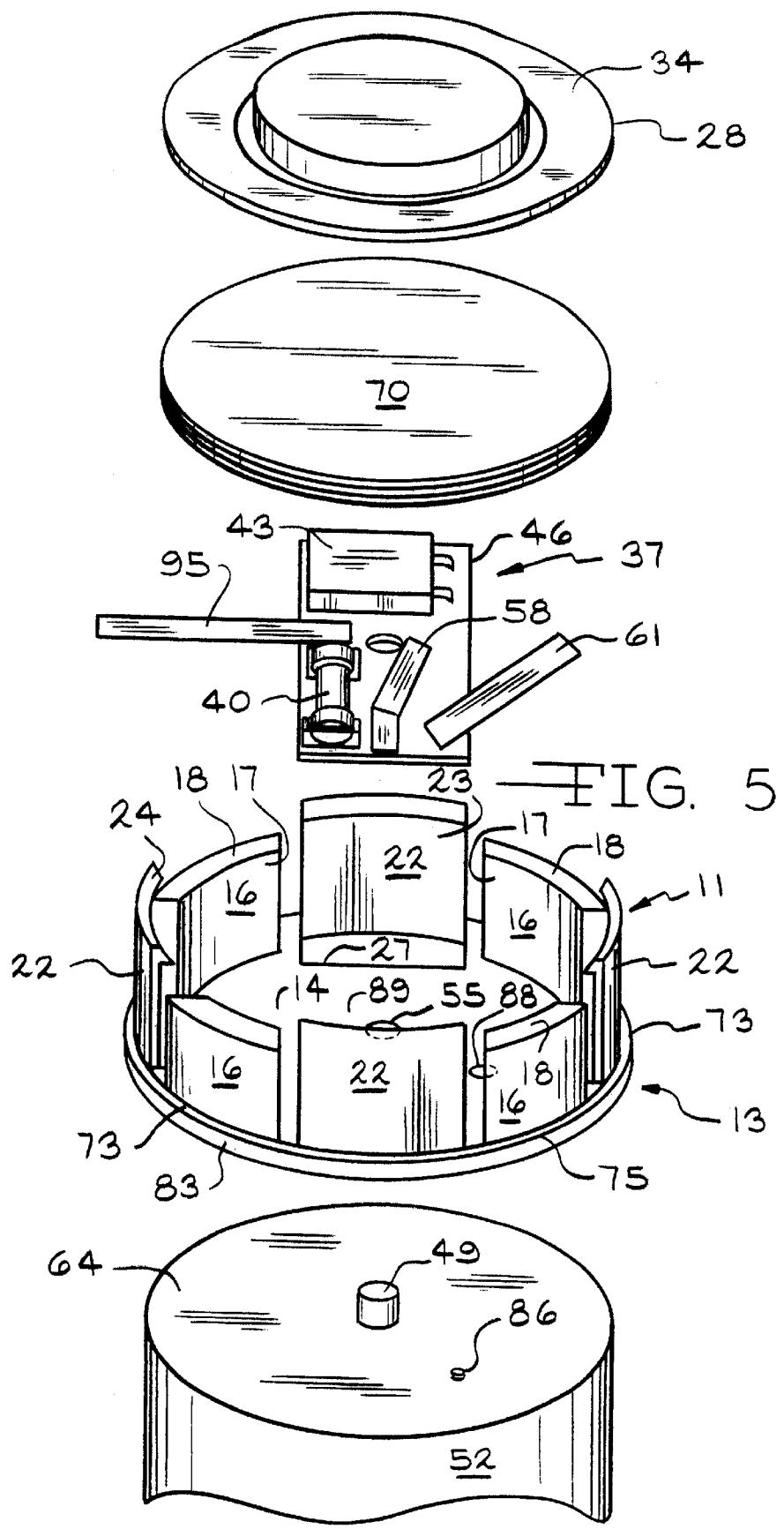
FIG. 5 is an exploded perspective view of the protection device and battery shown in FIG. 1.

FIGS. 1 and 2 show a protection device 10 according to the present invention in the assembled form. The protection device 10 includes a protective housing 11 (shown also in FIGS. 3, 4 and 5) having a base 12. As shown in FIGS. 3, 4 and 5, extending from a primary surface 14 of the base 12 is a projecting shoulder 16 having a curved side wall 17 extending to an upper surface 18, which is generally parallel to the primary surface 14. The curved side wall 17 extends generally perpendicularly from the primary surface 14 so that the upper surface 18 is at a first distance 19 from the primary surface 14.

The protective housing 11 also has a retaining clip 22 having an arcuate side wall 23 terminating in a hook portion 24. The hook portion 24 provides a retaining ledge 24A, which is generally parallel to the primary surface 14. The retaining ledge 24A is spaced from the primary surface 14 a second distance 25 above the primary surface 14. As shown in FIG. 4, the second distance 25 is greater than the first distance 19.

A material which is suitable for the protective housing 11 is Victrex (PEEK) 450-G manufactured by Victrex USA Inc. of Westchester, Pa. or alternatively a polyamide-imide available from DSM Engineering Plastic Products, Inc. of Reading, Pa. as Torlon 4203 PAI. Also suitable for the protective housing 11 and available from DSM Engineering Plastic Products, Inc. is a material marketed under the name Ketron™ PEEK 1000. Another material suitable for the protective housing 11 is liquid crystal polymer, commonly known as Zenite, and available from E.I. du Pont de Nemours and Company.

There are preferably at least three separate projecting shoulders 16 and at least three separate retaining clips 22. A measure of safety can be provided if four separate retaining clips 22 are provided, as shown in FIGS. 2, 3 and 5. As shown in FIGS. 2, 3, 5 and 6, a plurality of projecting shoulders 16 and retaining clips 22 may be provided in an alternating configuration about the circumference of the base 14.

To facilitate manufacturing the retaining clips 22, for example by injection molding, molding orifices 27 are preferably provided in the base 12. The molding orifices 27 allow a portion of a mold to extend through the base 12 to form the retaining ledge 24A at the second distance 25. Once the retaining clips 22 are formed, the mold is withdrawn through the molding orifices 27.

The protection device 10 according to the present invention also includes a terminal cap 28. As shown in FIGS. 1 and 2, a portion of a first side 31 of the terminal cap 28 rests on the upper surface 18 of the projecting shoulder 16. In addition, a portion of a second side 34 of the terminal cap 28 contacts the retaining ledge 24A of the retaining clip 22. The difference between the first distance 19 and the second distance 25 may be such that the terminal cap 28 is firmly held against the upper surface 18 of the projecting shoulder 16 and the retaining ledge 24A of the retaining clip 22, as shown in FIG. 2.

Figure 6:
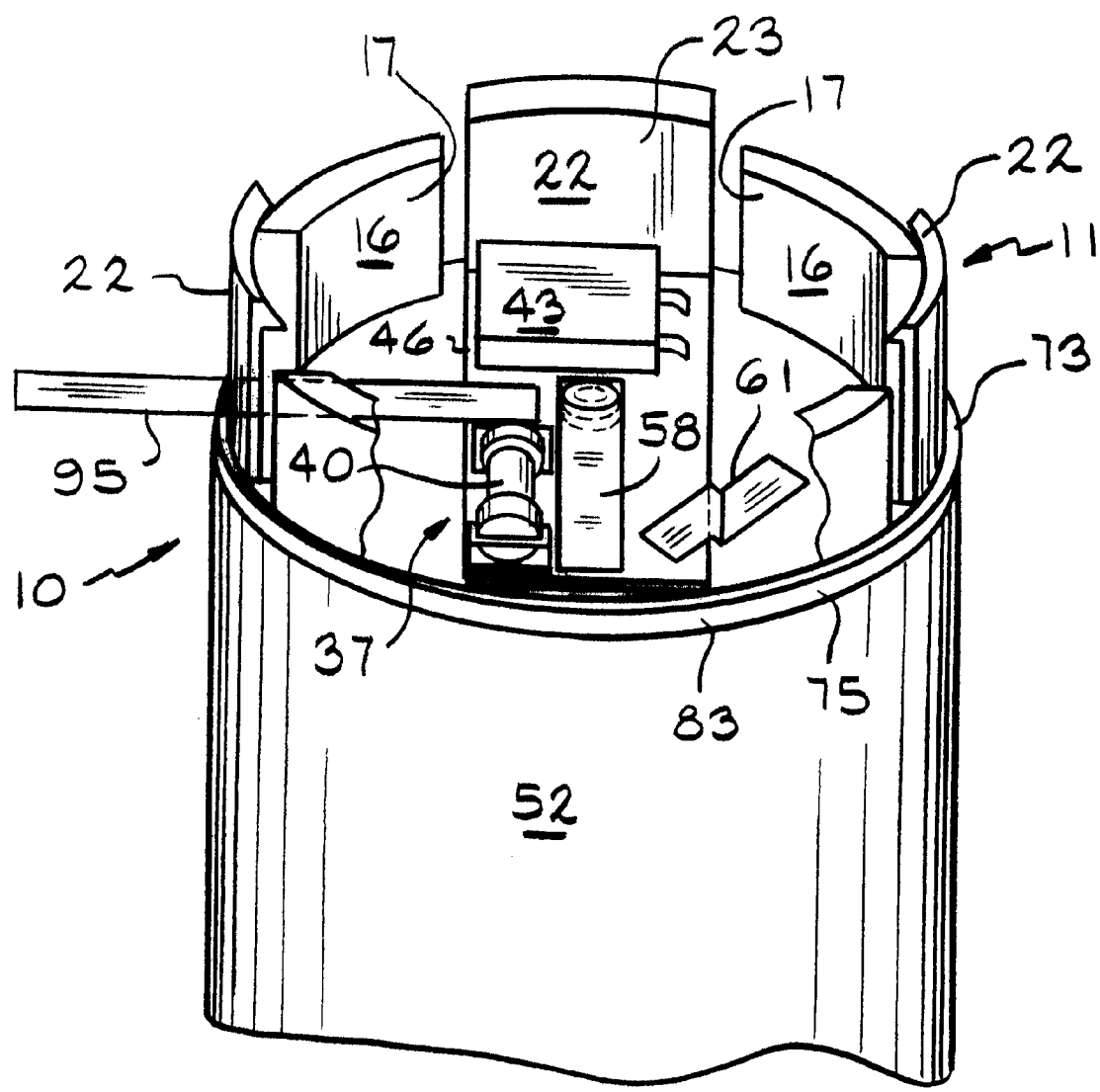
FIG. 6 is a perspective view of the battery, protective housing and electrical component shown in FIG. 1.

FIGS. 5 and 6 show the relative position of an electrical component 37 with respect to the protection device 10. The electrical component 37 may include a fuse 40 and a diode 43 mounted on an insulating substrate 46. Those skilled in the art will recognize that the diode 43 and/or substrate 46 may be omitted depending on the particular intended application. A terminal pin 49 of a battery 52 extends through a contact hole 55 in the base 12 and is connected to a first lead 58 of the electrical component 37 by welding the first lead 58 to the terminal pin 49. When the diode 43 is present in the electrical component 37, sometimes a second lead 61 is connected to a header 64 of the battery 52 by passing the second lead 61 through one of the molding orifices 27. The second lead 61 may be electrically connected to the header 64 by welding.

As shown in FIGS. 1 and 5, the present invention may include a compressible pad 70 for holding the electrical component 37 firmly in place. As shown in FIG. 1, once the terminal cap 28 contacts the retaining clip 22, the compressible pad 70 contacts and is compressed between portions of the electrical component 37 and portions of the terminal cap 28. The compressible pad 70 may serve also to hold the terminal cap 28 firmly against the retaining clip 22 and off of projecting shoulder 16. Those skilled in the art will recognize that by placing a retaining ring around the retaining clips 22 and projecting shoulders 16, or by using a fast curing or highly viscous adhesive material, an adhesive type material similar to that used in the prior art may be used. The compressible pad 70, however, is preferred because it reduces assembly costs and mess associated with the prior art adhesive material.

The compressible pad 70 is a material which can withstand at least about 200° C., and is preferably a silicone based material. A silicone based material which is suitable for use in the compressible pad 70 is available from Furon Company of New Haven, Conn. as product number Rl0470 and referred to by the trademark COHRlastic®.

It is important to prevent the protective housing 11 from rotating relative to the battery 52 so that the first and second leads 58, 61 are not detached from the terminal pin 49 and header 64, respectively. Although the protective housing 11 is prevented to some extent from rotating by the first lead 58 connected to the terminal pin 49, and by the second lead 61 connected to the header 64, the protective housing 11 may be further prevented from rotating by providing a shelf 73, an edge 75 and a wrap 77. The shelf 73 is provided by positioning the retaining clip 22 to extend from a location on the primary surface 14 which is set back from a peripheral rim 83 of the base 12. The shelf 73 is defined by the intersections of the retaining clip 22 and the peripheral rim 83 with the primary surface 14. Alternatively, or in addition, the shelf 73 is provided by positioning the projecting shoulder 16 to extend from a location on the primary surface 14 which is set back from the peripheral rim 83 so as to define the shelf 73 formed by the intersections of the projecting shoulder 16 and the peripheral rim 83 with the primary surface 14. The intersection of the shelf 73 and the peripheral rim 83 defines the edge 75.

When the base 12 is provided with the shelf 73, a wrap 77, shown in FIG. 1, may be placed around a portion of the header 64 and a portion of the protective housing 11, including the shelf 73. The shelf 73 provides a discontinuity in the otherwise cylindrical surface covered by the wrap 77. The edge 75 extends into the wrap 77, thereby preventing the base 12 from rotating relative to the header 64 when the wrap 77 is sufficiently tight around the base 12 and battery 52. The wrap 77 is preferably made from an electrically insulating material such as polymerized tetrafluoroethylene or polyester. The wrap 77 may be heat-shrunk into the proper position.

When manufacturing certain types of batteries 52, electrolyte is introduced through the header 64 using a fill hole. Once the battery 52 has the proper amount of electrolyte inside, the fill hole is closed usually by welding a metallic material to the header 64. The metallic material often extends from the header 64 as a metallic projection 86, shown in FIG. 5. Although the metallic projection 86 does not extend far beyond the header 64, since it is desirable to have the base 12 firmly supported by the header 64, an accommodating orifice 88 may be positioned in the base 12 to accommodate the metallic projection 86 therein.

Figure 7:
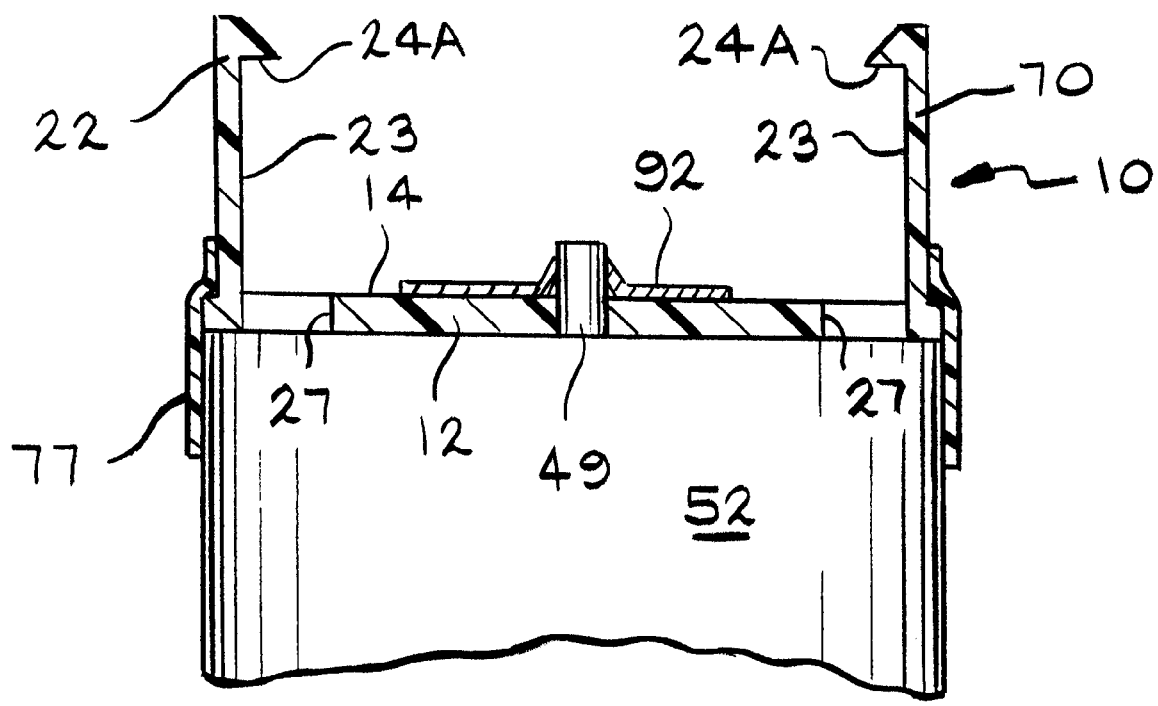
FIG. 7 is a partially cross sectioned side view of the protective housing taken along line 7—7 shown in FIG. 3.

To further secure the base 12 to the header 64, a means for fastening may be provided. As shown in FIG. 7, the means for fastening may be a tinnerman fastener 92 which contacts the base 12, and attaches to a portion of the terminal pin 49 extending through the contact hole 55.

The terminal cap 28 is preferably electrically conductive. A third lead 95, shown in FIGS. 2, 5 and 6, is electrically connected to the terminal cap 28. The third lead 95 may be electrically connected to the terminal cap 28 by welding.

Figure 8:
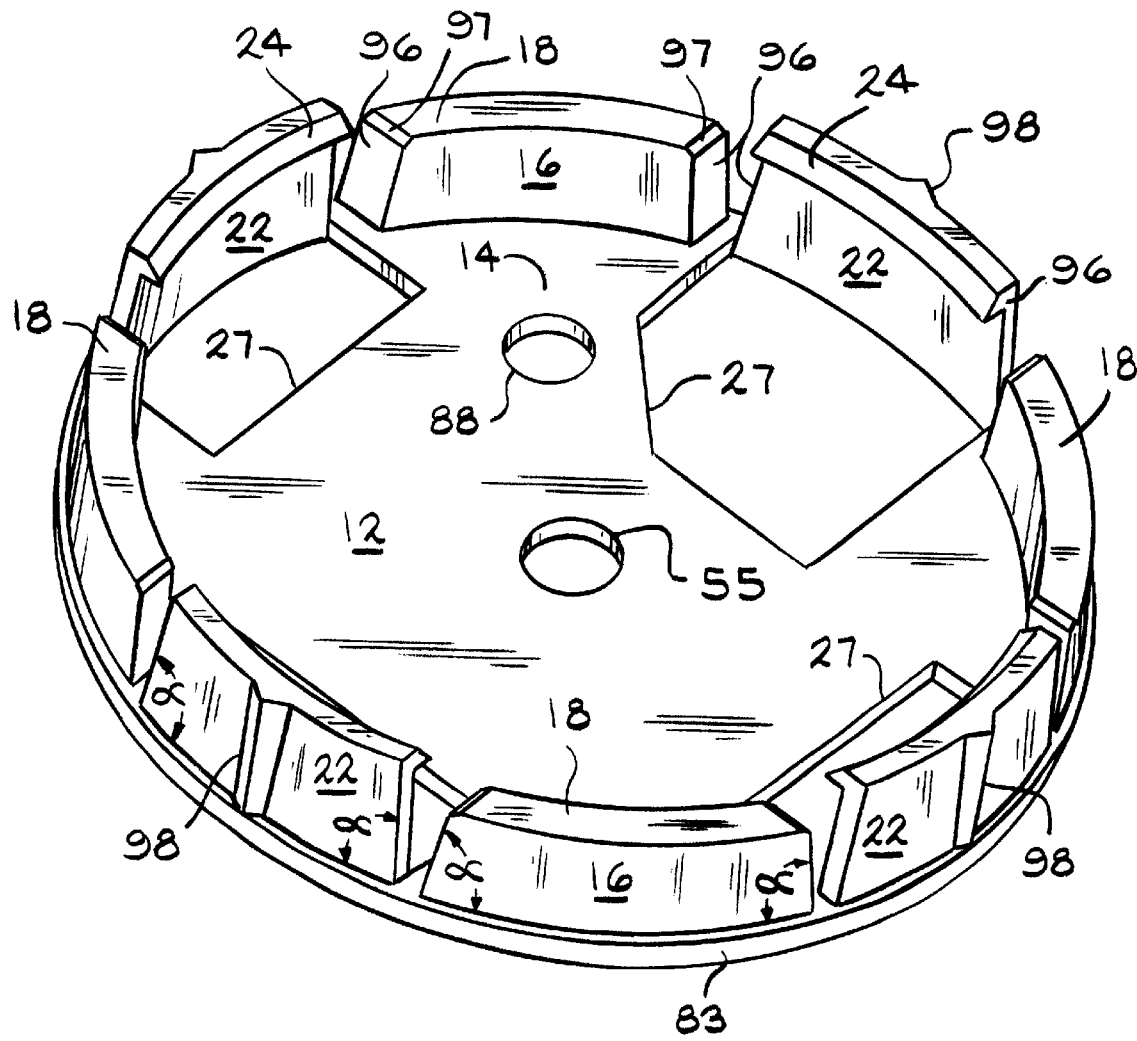
FIG. 8 is a perspective view of an alternative embodiment of the protective housing.

FIG. 8 shows an alternative embodiment of the protective housing 11. To facilitate molding the protective housing 11, interstitial side walls 96 of the projecting shoulders 16 and retaining clips 22 are tapered so that the interstitial side walls 96 do not form a right angle with the primary surface 14, and instead form an acute angle $\alpha$ with the primary surface 14. A five degree taper ($\alpha=85°$) is appropriate for facilitating separation of the mold from the protective housing 11 and for decreasing wear on the mold. Also shown in FIG. 8 are rounded edges 97 on the projecting shoulders 16 and retaining clips 22. A mold having rounded edges 97 is easier to construct. Finally, FIG. 8 shows ribs 98 on the retaining clips 22. The ribs 98 permit the material used to form the protective housing 22 to flow within the mold to completely and consistently form the retaining clips 22.

Figure 9:
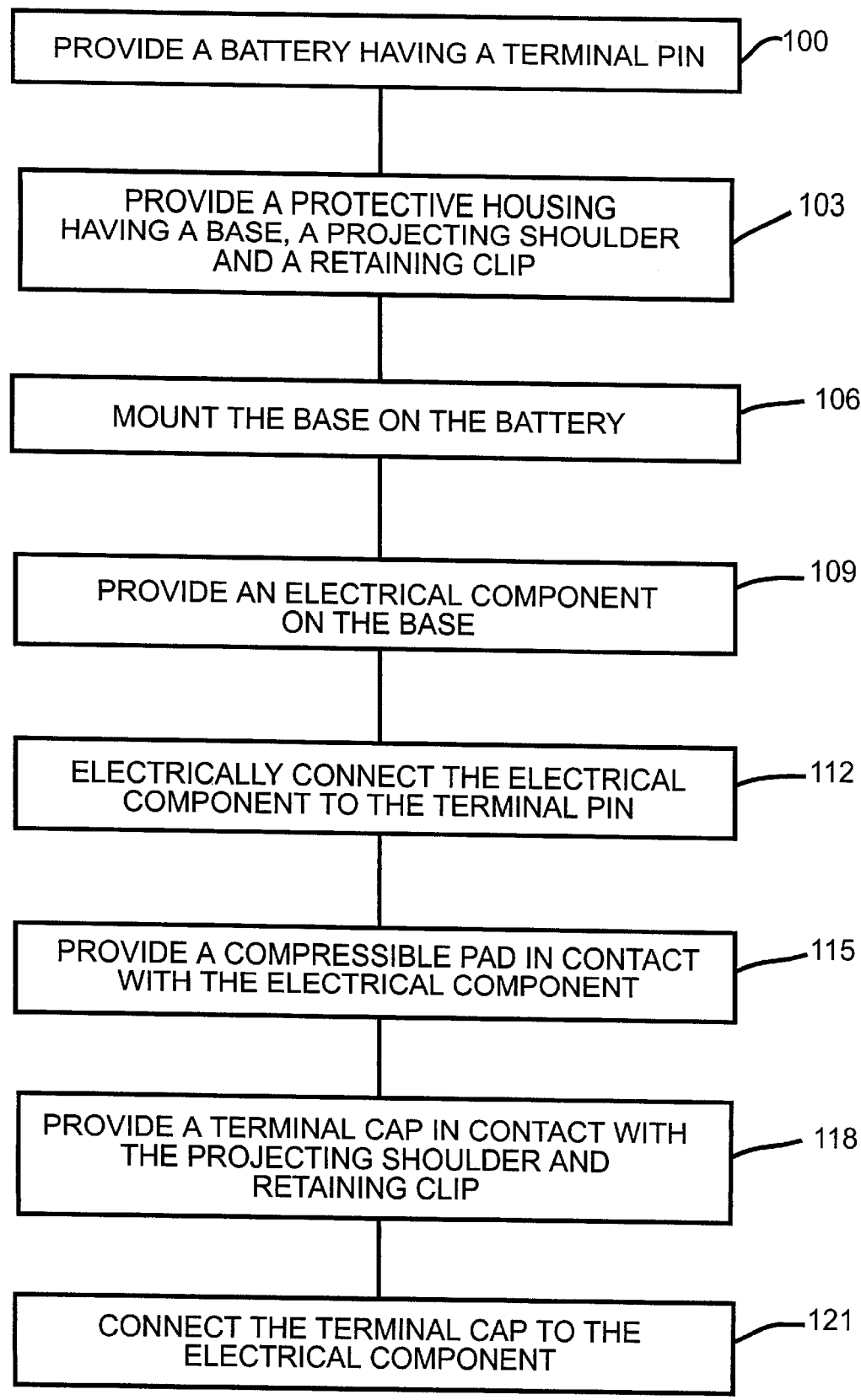
FIG. 9 is a flow chart of a method according to the present invention.

FIG. 9 shows steps of a method according to the present invention in which a battery and an electrical component, such as those described above, are assembled. The method begins by providing (step 100) a battery having a terminal pin, and providing (step 103) a protective housing having a base with a contact hole therethrough, a projecting shoulder and a retaining clip. The base is mounted (step 106) on the battery so that the terminal pin extends into the contact hole. Next, an electrical component is provided (step 109) on the base and electrically connected (step 112) to the terminal pin. Then, a terminal cap is provided (step 118) in contact with the projecting shoulder and the retaining clip, and the terminal cap is electrically connected (step 121) to the electrical component. In an alternative embodiment of the method according to the present invention, a compressible pad is provided (step 115) in contact with the electrical component.

Figure 10:
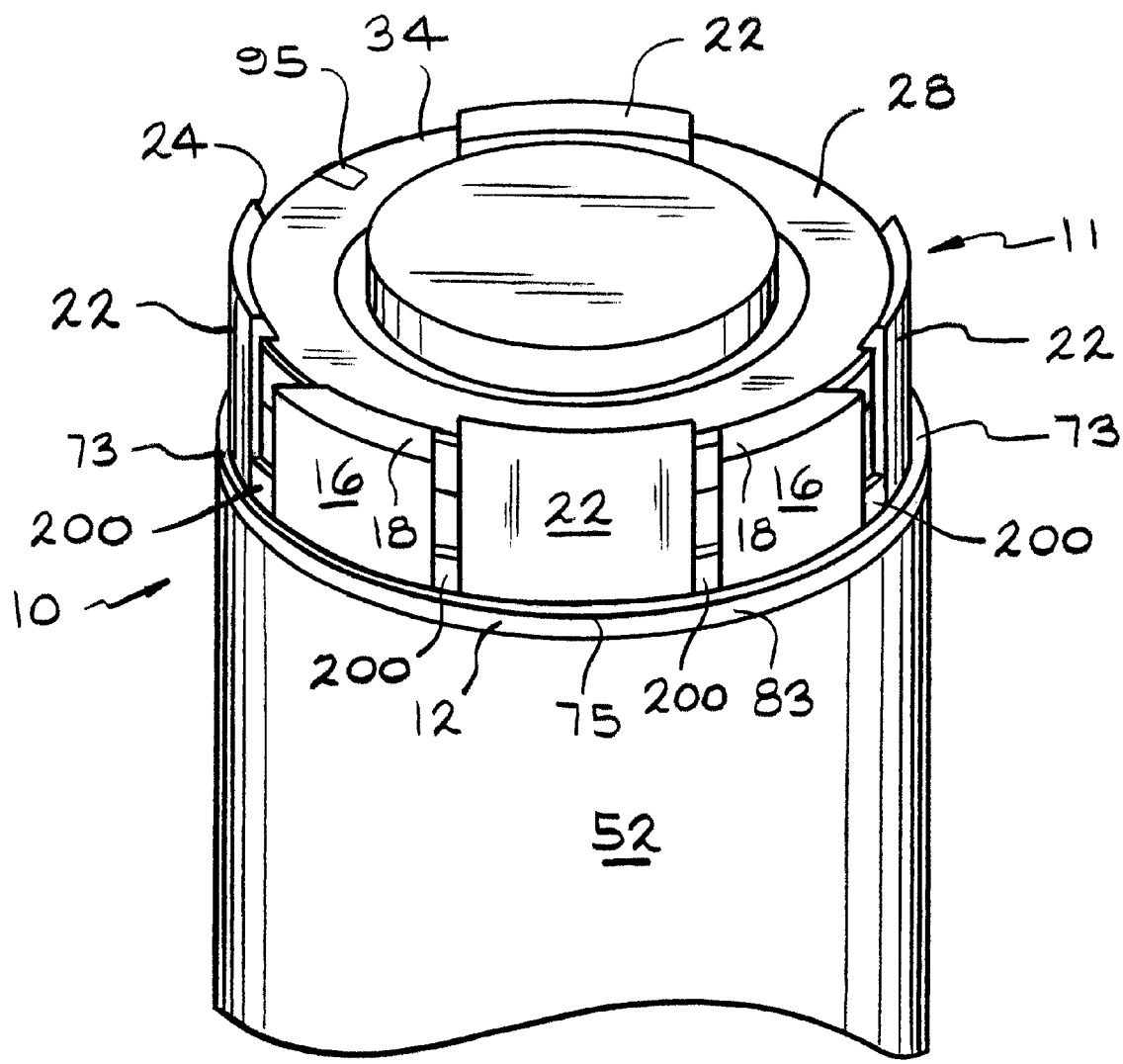
FIG. 10 is a perspective view of an alternative embodiment of the present invention.
Figure 11:
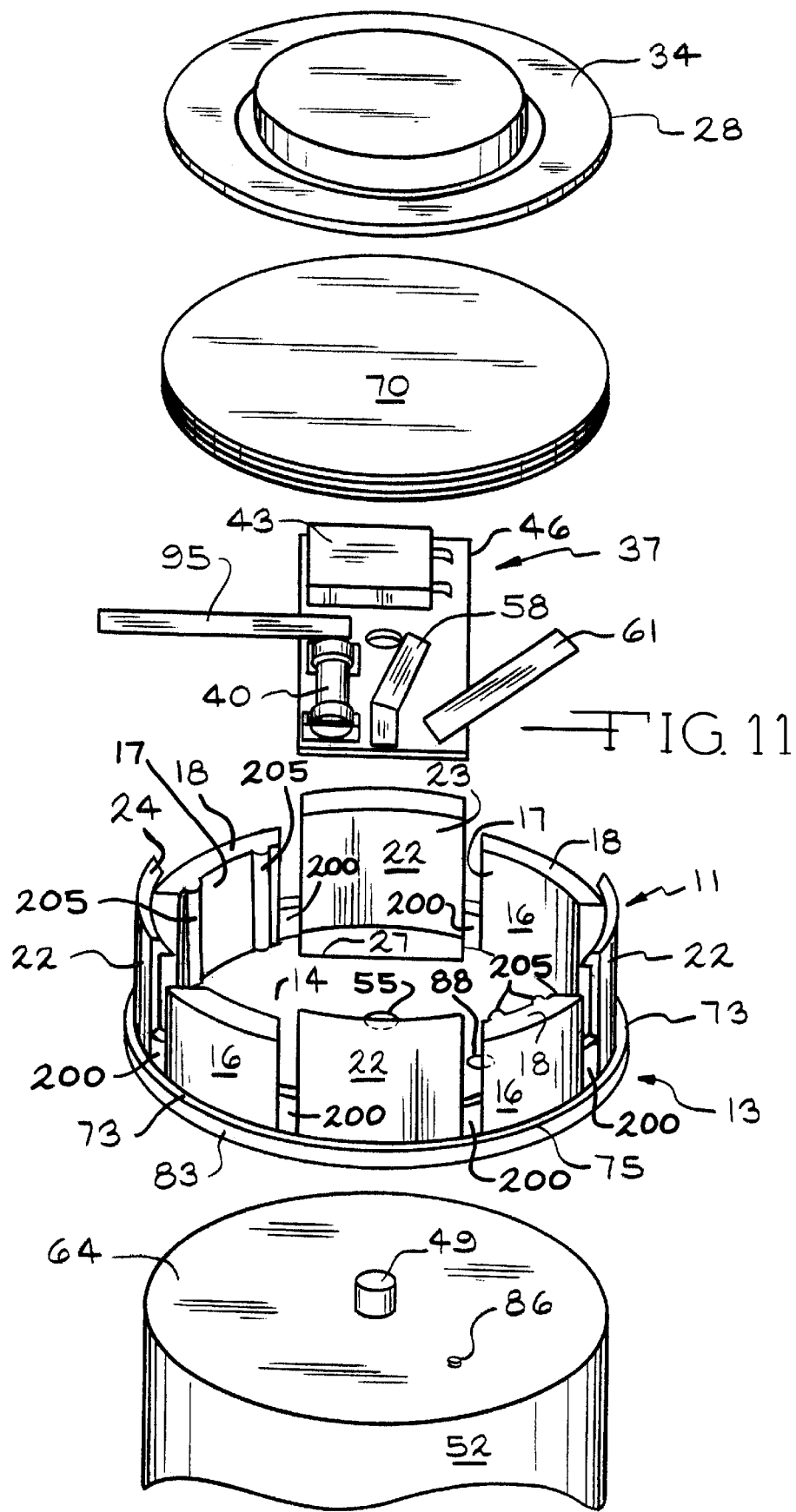
FIG. 11 is an exploded perspective view of the embodiment shown in FIG. 10.

FIGS. 10 and 11 show an alternative embodiment of the present invention in which connecting walls 200 connect to the arcuate side wall 23 of the retaining clip 22, and connect to the curved side wall 17 of the projecting shoulder 16. The connecting walls 200 stiffen the retaining clips 22. FIG. 11 also shows a variation on the projecting shoulder 16 described above. In FIG. 11, some of the projecting shoulders 16 have ribs 205 formed on the curved side wall 17. It should be noted that any number of the shoulders 16 may have ribs 205. The ribs 205 increase the size of the upper surface 18, and thereby prevent part of the terminal cap 28 from moving too close to the primary surface 14.

FIG. 12 shows an alternative embodiment of the present invention in which a gasket 300 is placed between the base 12 and the header 64. The gasket 300 allows the protection 10 to be seated firmly on the header 64, even when the header 64 or the base 12 has irregularities in it. A preferred gasket 300 is made from an aramid insulating paper, such as Nomex™, and is preferably approximately 0.013 inches thick. To facilitate assembly of the protection device 10 to the header 64, the gasket 300 may have one or more adhesive layers for bonding to the header 64 and/or the base 12. For example, the gasket 300 may have a first adhesive layer 302 for bonding to the header 64, and may have a second adhesive layer 303 for bonding to the base 12. It should be noted that the thickness of the gasket 300 and the adhesive layers 302, 303 shown in FIG. 12 are not drawn to scale in order that the gasket 300 and the adhesive layers 302, 303 can be more easily understood.

FIG. 13 shows an insulator 310 placed between the first side 31 of the terminal cap 28 and the electrical component 37. This embodiment can be used when the compressible pad 70 is not used, although both the compressible pad 70 and the insulator 310 may be used together. The insulator 310 is preferably made from an aramid insulating paper, such as Nomex™. To facilitate assembly of the protection device 10, the insulator 310 may have an adhesive layer on one or more sides. For example, the insulator 310 may have an adhesive layer 315 for bonding the insulator 310 to the first side 31 of the terminal cap 28. Preferably, the insulator 310 is approximately 0.008 inches thick. It should be noted that FIG. 13 is not to scale with regard to the thickness of the insulator 310 and adhesive layer 315, so that the features of the insulator and adhesive layer 315 can be more easily understood.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A protection device for protecting an electrical component, comprising:

a protective housing having a base with a contact hole therethrough for receiving an electrical terminal pin, and having a projecting shoulder extending from the base to a first distance from the base, and having a retaining clip extending from the base to a second distance from the base, the second distance being greater than the first distance, and having a connecting wall connected to the projecting shoulder and the retaining clip; and a terminal cap having a first side and a second side, wherein in use, at least part of the first side of the terminal cap is prevented from moving beyond the projecting shoulder and at least part of the second side of the terminal cap is restrained by the retaining clip, thereby permitting the electrical component to reside between and be protected by the housing and the terminal cap.

2. The protection device of claim 1 wherein there are a plurality of projecting shoulders and a plurality of retaining clips provided about a circumference of the base in an alternating configuration.

3. The protection device of claim 1, further comprising a compressible pad in contact with the terminal cap.

4. The protection device of claim 3, wherein the compressible pad includes a silicone-based material.

5. The protection device of claim 1, wherein the base has a primary surface from which the projecting shoulder and the retaining clip extend, and wherein the base has a peripheral rim intersecting with the primary surface, and wherein the retaining clip extends from the base at a location which is set back from the peripheral rim so as to define a shelf on the primary surface between the retaining clip and the peripheral rim.

6. The protection device of claim 1, wherein the base has a primary surface from which the projecting shoulder and the retaining clip extend, and wherein the base has a peripheral rim intersecting with the primary surface, and wherein the projecting shoulder extends from the base at a location which is set back from the peripheral rim so as to define a shelf on the primary surface between the projecting shoulder and the peripheral rim.

7. The protection device of claim 1, wherein the base has an orifice therethrough for receiving a projection on a supporting surface which supports the base.

8. The protection device of claim 1, further including a means for fastening contacting the base and attached to an electrical terminal pin extending through the contact hole.

9. The protection device of claim 8, wherein the means for fastening is a tinnerman fastener.

10. An electrical power providing unit having a battery, an electrical component electrically connected to the battery, and a protection device for protecting the electrical component, the protection device comprising:
   a protective housing having a base with a contact hole therethrough for receiving a terminal pin of the battery, and having a projecting shoulder extending from the base to a first distance spaced from the base, and having a retaining clip extending from the base to a second distance spaced from the base, the second distance being greater than the first distance, and having a connecting wall connected to the projecting shoulder and the retaining clip, wherein the electrical component is supported by the base; and
   a terminal cap having a first side and a second side, wherein at least part of the first side of the terminal cap is restrained by the projecting shoulder and at least part of the second side of the terminal cap is restrained by the retaining clip; wherein,
   the electrical component resides between the base and the terminal cap.

11. The power providing unit of claim 10, further comprising a compressible pad contacting the terminal cap.

12. The power providing unit of claim 11, wherein the compressible pad includes a silicone-based material.

13. The power providing unit of claim 10, further comprising a compressible pad contacting the electrical component.

14. The power providing unit of claim 10, wherein the base has a primary surface from which the projecting shoulder and the retaining clip extend, and wherein the base has a peripheral rim intersecting with the primary surface, and wherein the retaining clip extends from the base at a location which is set back from the peripheral rim so as to define a shelf on the primary surface between the retaining clip and the peripheral rim.

15. The power providing unit of claim 10, wherein the base has a primary surface from which the projecting shoulder and the retaining clip extend, and wherein the base has a peripheral rim intersecting with the primary surface, and wherein the projecting shoulder extends from the base at a location which is set back from the peripheral rim so as to define a shelf on the primary surface between the projecting shoulder and the peripheral rim.

16. The power providing unit of claim 10, wherein the base has an orifice therethrough for receiving a projection on the battery.

17. The power providing unit of claim 16, further including a metallic substance bonded to the battery, and at least partially residing in the orifice.

18. The power providing unit of claim 17, wherein the metallic substance is characterized as having been welded to the battery.

19. The power providing unit of claim 10, further including a means for fastening contacting the base and the terminal pin of the battery.

20. The power providing unit of claim 19, wherein the means for fastening is a tinnerman fastener.

21. The power providing unit of claim 10, further including a wrap at least partially covering the protective housing and at least partially covering the battery.

22. A protection device for protecting an electrical component, comprising:
   a protective housing having a base with a contact hole therethrough for receiving an electrical terminal pin, and having a projecting shoulder extending from the base to a first distance from the base, and having a retaining clip extending from the base to a second distance from the base, the second distance being greater than the first distance, and wherein the projecting shoulder has a rib; and
   a terminal cap having a first side and a second side, wherein in use, at least part of the first side of the terminal cap is prevented from moving beyond the projecting shoulder and at least part of the second side of the terminal cap is restrained by the retaining clip, thereby permitting the electrical component to reside between and be protected by the housing and the terminal cap.

23. An electrical power providing unit comprising:
   a battery,
   an electrical component electrically connected to the battery,
   a protection device for protecting the electrical component, wherein the protection device includes a protective housing having a base with a contact hole therethrough for receiving a terminal pin of the battery, and having a projecting shoulder extending from the base to a first distance spaced from the base, and having a retaining clip extending from the base to a second distance spaced from the base, the second distance being greater than the first distance, and having a connecting wall connected to the projecting shoulder and the retaining clip, wherein the electrical component is supported by the base;
   a gasket residing between the battery and the protection device; and
   a terminal cap having a first side and a second side, wherein at least part of the first side of the terminal cap is restrained by the projecting shoulder and at least part of the second side of the terminal cap is restrained by the retaining clip, wherein the electrical component resides between the base and the terminal cap.

24. The power providing unit of claim 23, wherein the gasket has an adhesive layer thereon for bonding the gasket to the battery.

25. The power providing unit of claim 23, wherein the gasket has an adhesive layer thereon for bonding the gasket to the protection device.

26. A protection device for protecting an electrical component, comprising:
   a protective housing having a base with a contact hole therethrough for receiving an electrical terminal pin, and having a projecting shoulder extending from the base to a first distance from the base, and having a retaining clip extending from the base to a second distance from the base, the second distance being greater than the first distance, and having a connecting wall connected to the projecting shoulder and the retaining clip;

a terminal cap having a first side and a second side, wherein in use, at least part of the first side of the terminal cap is prevented from moving beyond the projecting shoulder and at least part of the second side of the terminal cap is restrained by the retaining clip, thereby permitting the electrical component to reside between and be protected by the housing and the terminal cap; and an insulator proximate to the terminal cap to electrically insulate the terminal cap from at least part of the electrical component.

27. The protection device of claim 26, wherein the insulator has an adhesive layer thereon.

28. The protection device of claim 26, wherein the insulator is bonded to the terminal cap.

* * * * *